United States Patent [19]
Fohl et al.

[11] Patent Number: 5,700,078
[45] Date of Patent: Dec. 23, 1997

[54] LASER ILLUMINATED LIGHTING SYSTEM

[75] Inventors: Timothy Fohl, Carlisle, Mass.; Michael Anthony Marinelli, Northville; Jeffrey Thomas Remillard, Ypsilanti, both of Mich.

[73] Assignee: Ford Global Technologies, Inc., Dearborn, Mich.

[21] Appl. No.: 780,034

[22] Filed: Dec. 23, 1996

[51] Int. Cl.⁶ ................................ F21V 7/04; F21V 8/00
[52] U.S. Cl. ........................ 362/32; 362/259; 362/61; 362/80; 362/301
[58] Field of Search ............................ 362/61, 80, 32, 362/259, 31, 297, 298, 299, 300, 301, 347, 350

[56] References Cited

U.S. PATENT DOCUMENTS

| | | | |
|---|---|---|---|
| 4,389,698 | 6/1983 | Cibie | 362/32 |
| 4,432,039 | 2/1984 | Cibie | 362/31 |
| 5,295,047 | 3/1994 | Windross | 362/26 |
| 5,365,412 | 11/1994 | Koppolu et al. | 362/32 |
| 5,434,754 | 7/1995 | Li et al. | 362/32 |
| 5,515,244 | 5/1996 | Evins | 362/32 |

*Primary Examiner*—Thomas M. Sember
*Attorney, Agent, or Firm*—David B. Kelley

[57] ABSTRACT

A tail lamp assembly for an automotive vehicle includes a remote laser light source coupled with a light transmitting fiber optic light pipe which illuminates a unitary thin sheet optic having an input section, a manifold section, and a kicker section.

17 Claims, 2 Drawing Sheets

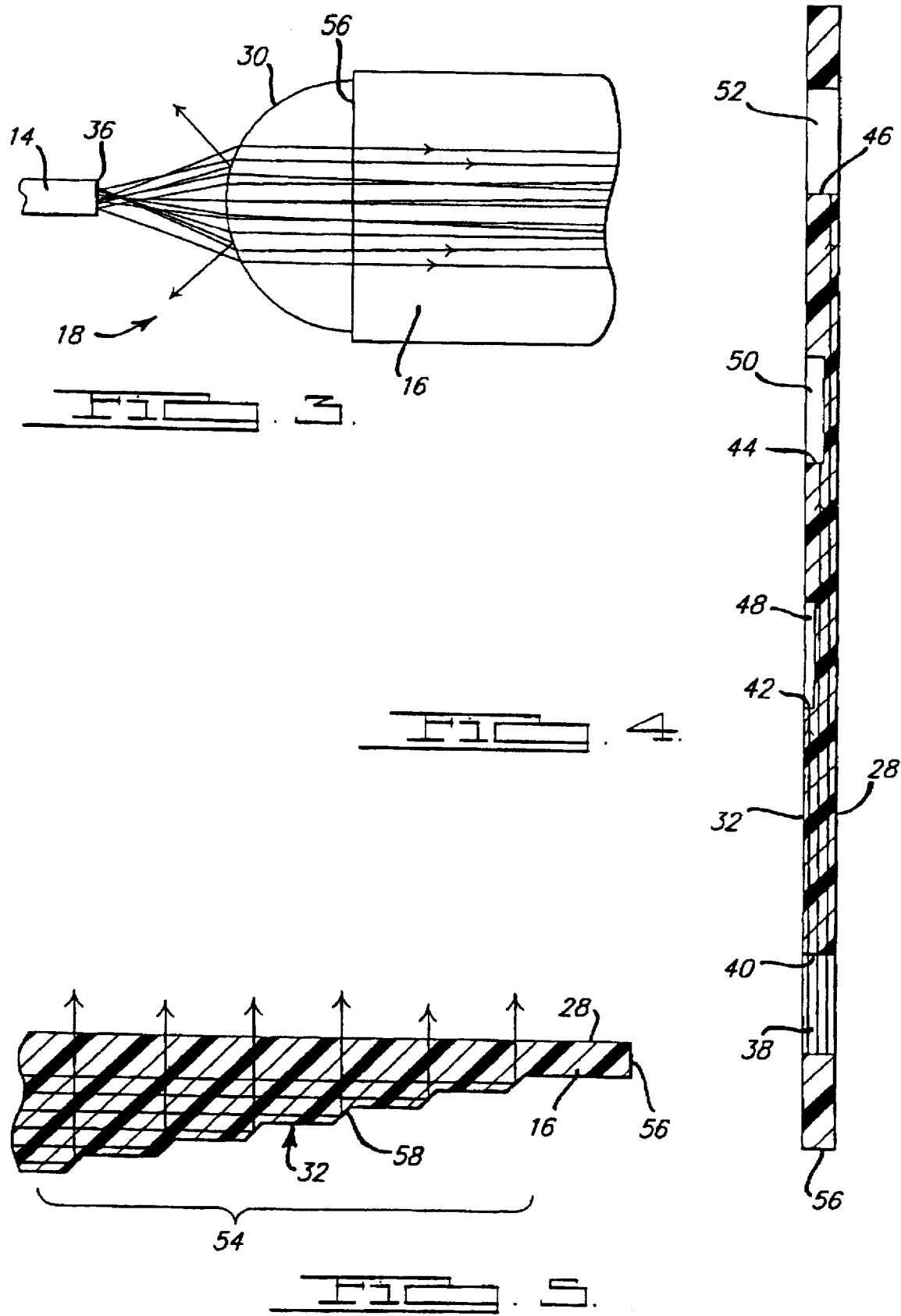

LASER ILLUMINATED LIGHTING SYSTEM

FIELD OF THE INVENTION

The present invention relates to a vehicle lighting system, and more specifically, to a laser illuminated, unitary thin sheet optic vehicle lighting system.

BACKGROUND OF THE INVENTION

Conventional light transmission systems used for vehicle head lights or tail lights typically use a bulb and reflector system. In a bulb and reflector system the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. Typically, in an automotive application, a conventional bulb and reflector system collects and reflects only thirty percent of the light emitted from the bulb filament into the useful lighting area.

Bulb and reflector systems have several disadvantages, including aerodynamics and aesthetic styling; e.g., the depth of the reflector along its focal axis and the height of the reflector in directions perpendicular to the focal axis greatly limited attempts at streamlining vehicle contours. Additionally, thermal energy given off by the bulb during operation must be considered and the size of the reflector as well as the material used in its construction vary depending upon the amount of thermal energy generated by the bulb filament. Decreasing the size of the reflector requires use of materials with high thermal resistivity for the reflector.

One approach to develop an automotive lighting system for use with the newer streamlined body designs is proposed in U.S. Pat. No. 5,434,754, assigned to the assignee of the present invention, which discloses the combination of a fiber optic light pipe which transmits light from a remote light source, a light manifold, and a reflector. There are a number of problems associated with such an approach. First, remote lighting to date is typically a high intensity discharge source coupled with a reflector. The light is focused into a large diameter light guide which transmits the light to the desired location. The high intensity discharge source produces a substantial amount of heat which tends to degrade the light guide. Environmental factors have a further degrading effect on conventionally used light guide. The light guide typically must be 8–12 mm thick in order to capture the requisite amount of light from the source. These guides are very expensive and difficult to work with. Further, this structure requires assembly of a lens, a multifaceted reflector, and a manifold portion to form the vehicle taillight. Also, the manifold portion must be indexed relative to the reflector portion.

Therefore, it would be desirable to provide a laser illuminated, unitary thin sheet optic tail lamp assembly for a vehicle which accommodates manufacturing and thermal considerations as well as the space limitations dictated by the vehicular aerodynamic and styling requirements.

SUMMARY OF THE INVENTION

Responsive to the deficiencies in the prior art, the tail lamp assembly of the present invention provides an assembly that includes a remote laser light source, a light guide connected to the remote laser light source for transmitting light, and a unitary optical element which receives light from the light guide. The unitary optical element has an input portion having a light collimator, a manifold portion having an aperture defining a parabolic surface normal to a front surface of the optical element, the manifold further has a plurality of recesses adjacent to the parabolic surface including a most proximate recess and a most distal recess, these recesses define reflective surfaces normal to the front surface and increase incrementally in depth from the most proximate recess to the most distal recess and, a kicker portion which has a plurality of reflective facets extending the length of the kicker portion for reflecting light out of the unitary optical element.

An advantage of the present invention, in addition to reducing the overall package size of the tail lamp, is ease of assembly and alignment. The fiber optic light guides of the present invention are approximately 1 mm in diameter and therefore make implementing the tail light assembly into the vehicle much easier. The fiber optic light guides of the present invention are also less expensive than the light guides used in the past. The present remote lighting system, having an integral manifold and kicker section, does not require the extra steps of assembling tail lamp components or indexing the manifold and kicker portions.

A particular advantage of the preferred embodiment of the present invention is ease of manufacture. The manifold and kicker of the thin sheet optic are made integral as a result of being formed in a single injection molding process. In addition, a low profile and highly efficient lighting system can be developed allowing a designer greater latitude with respect to aerodynamic and aesthetic styling.

Additionally, the laser and any associated thermal energy are contained at a remote light source. Only the laser light is transmitted to the thin sheet optic. Any design requirements due to thermal considerations or concerns may now be eliminated.

BRIEF DESCRIPTION OF THE DRAWINGS

Other features and advantages of the present invention will become apparent to those skilled in the automotive vehicle lighting arts upon reading the following description with reference to the accompanying drawings, in which:

FIG. 3 is a side view of an enlargement of the input portion of the thin sheet optical element of FIG. 2;

FIG. 4 is a sectional view of the manifold portion of the thin sheet optical element of FIG. 2 taken along the line 4—4; and FIG. 5 is a sectional view of the kicker portion of the thin sheet optical element of FIG. 2 taken along the line 5—5.

DETAILED DESCRIPTION OF THE PREFERRED EMBODIMENT

Figure 1:
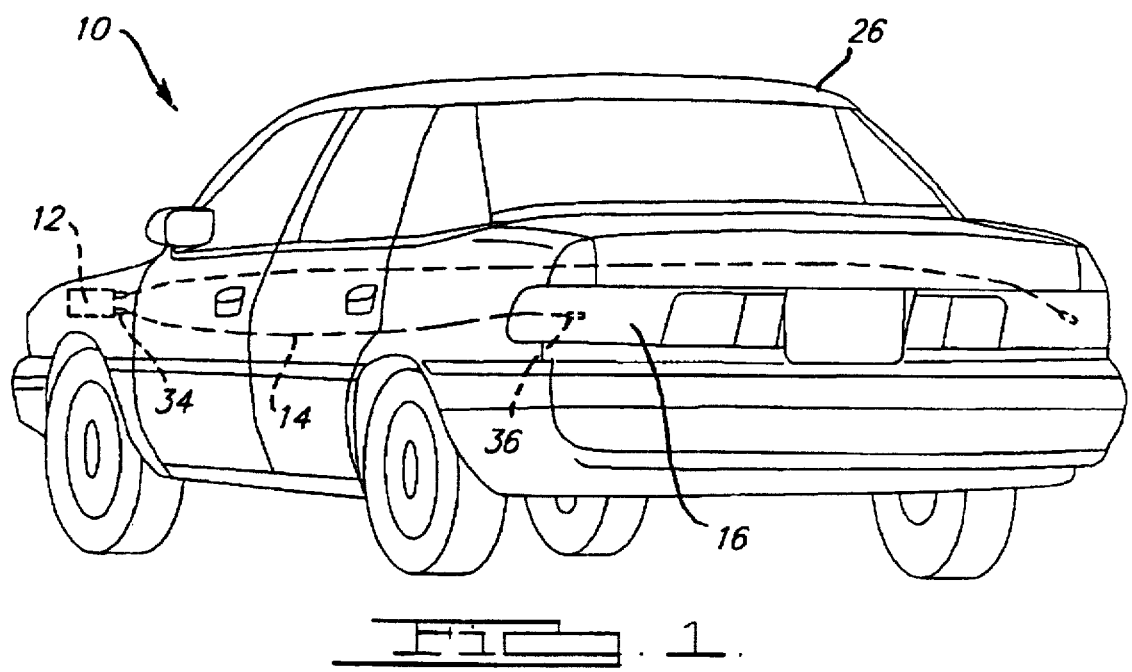
FIG. 1 is a perspective view of an automotive vehicle with a remote vehicle lighting assembly.
Figure 2:
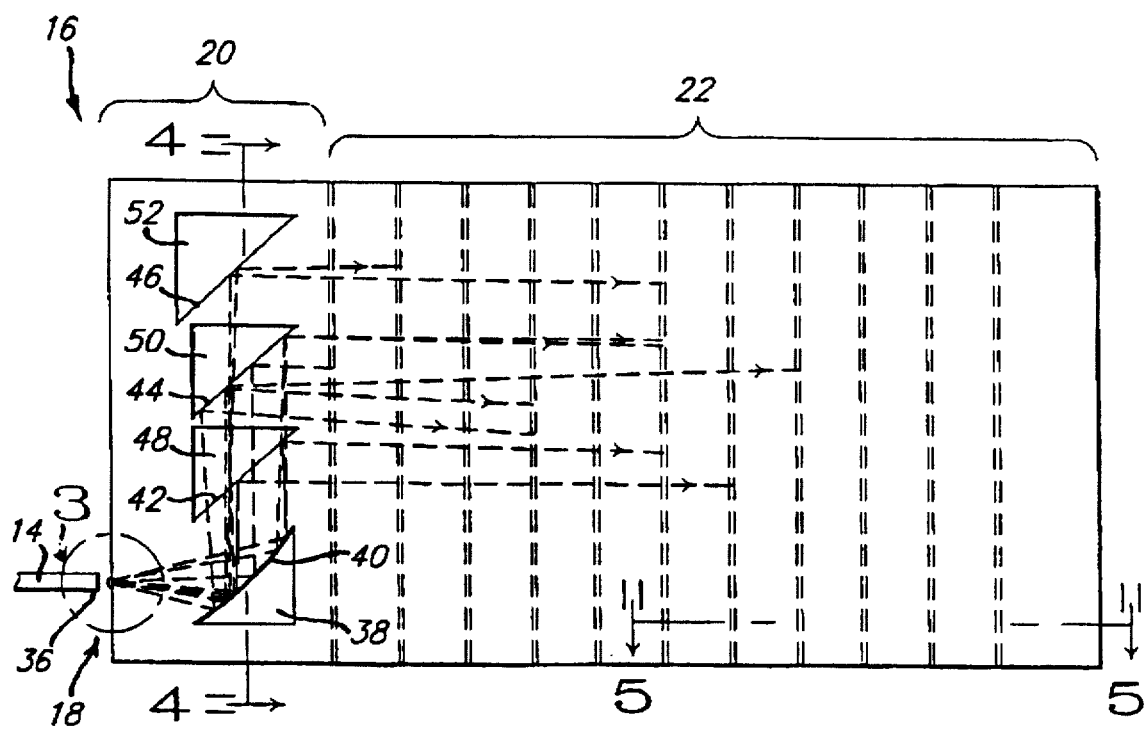
FIG. 2 is a top plan view of a thin sheet optical element according to the present invention.

Turning now to the drawings, and in particular to FIGS. 1 and 2 thereof, an automotive vehicle 26 is shown having a remote lighting assembly 10 using, in combination, a remote laser light source 12, a fiber optic light guide 14 coupled to the remote laser light source 12 at one end in conventional fashion, and a thin sheet optical element 16 adjacent a second end of the light guide. The thin sheet optical element 16 of the present invention is herein configured as a vehicle tail lamp, however, those skilled in the vehicle lighting arts will understand that the thin sheet optical element 16 may be configured as a head lamp or used for other vehicle lighting applications. Hence, the present configuration is meant only to be illustrative and not limiting.

As depicted in FIG. 2, a laser illuminated thin sheet (10 μm–6 mm) optical element 16 is comprised of an input section 18 which receives light from the light guide 14, a manifold section 20 that expands the incoming laser light, and a kicker section 22 that directs light normal to a front surface 28, as shown in FIG. 5, in a manner suitable for the specific application.

As illustrated in FIG. 1, a remote laser light source 12 is positioned in an automotive vehicle 10 with consideration given to vehicle design requirements and manufacturing ease relative to the particular lighting objectives. One possible location for the remote laser light source 12 is in the engine compartment (not shown). A single diode laser source is preferably used to provide light for the thin sheet optical element 16 of the vehicle 26. Diode lasers offer many advantages over conventional remote lighting sources such as halogen bulbs, light emitting diodes, and arc lamps. Most importantly, the diode laser has a radiance that is many orders of magnitude higher than conventional sources. For example, sources such as halogen lamps and light emitting diodes have brightness' of 15–200 cd/mm$^2$ in contrast to a laser which can have a brightness typically reaching 200,000 cd/mm$^2$. Additionally, lasers are more efficient at converting power into light of the desired wavelength. For example, for an incandescent lamp approximately 1.5% of the input power is converted into red light. Typical laser diodes emitting in the 635–670 nm band have conversion efficiencies of approximately 15%. Also, because the laser diode does not rely on high temperatures to generate light, it will have a lifetime significantly longer than that of incandescent sources.

The fiber optic light guide 14 is utilized to transmit light from the remote laser light source 12. Because of the high brightness (candela per unit area) of the laser, small diameter (0.1–1.0 mm) glass fibers are preferably used to transmit the light. The use of small diameter glass fibers provides several benefits over the monofilament plastic pipes and glass fiber bundles used in non-laser based remote lighting systems. Small diameter glass fibers are less bulky than plastic pipes or glass fiber bundles which typically are 10–12 mm in diameter. Also, small diameter glass fibers are significantly cheaper than monofilament plastic pipe or glass fiber bundles. Plastic light pipes have the tendency to deteriorate and "yellow" when exposed to the environmental heat and the heat from the high intensity light of conventional remote light sources. Additionally, small glass fibers are easier to package, handle, and install than plastic pipes or glass fiber bundles and they weigh less. Finally, the directional nature of the laser and small area of the emitting aperture (approximately 1×250 μm$^2$) results in a coupling efficiency of greater than 85% into a 1 mm diameter fiber. Such an efficiency is difficult to achieve with conventional light sources using plastic pipe or glass fiber bundles.

Turning now to FIGS. 2–5, according to one preferred embodiment of the present invention, the unitary thin sheet optical element 16 contains an input section 18, a manifold section 20, and a kicker section 22. The unitary thin sheet optical element 16 is preferably a polymeric sheet ranging in thickness from 2–6 mm. The unitary thin sheet optical element 16 is generally rectangular and generally planar having a front surface 28, an opposing back surface 32 generally parallel to the front surface 28, and a perimeter edge 56 generally normal to the front and back surfaces 28 and 32 respectively. The front surface 28 is situated to receive light from the kicker section 22. The thin sheet optical element 16 is preferably made from a transparent, solid piece of plastic such as polycarbonate and utilizes the principle of total internal reflection (TIR) to reflect light. TIR is explained in more detail below. Other transparent materials such as acrylics may also be used.

The remote laser light source 12 is connected to a first end 34 of the fiber optic light guide 14 via a light coupler (not shown) such as those known in the art. The second end 36 of the fiber optic light guide 14 is situated adjacent to the input section 18 of the thin sheet optical element 16. In use, light is emitted from the remote laser light source 12, is received by the fiber optic light guide 14 via a light coupler, is transmitted through the fiber optic light guide 14 via TIR, and is emitted at the second end 36 incident upon the input section 18 of the thin sheet optical element 16.

In FIG. 3 an enlarged view of the input section 18 is shown. The light is received from the second end 36 of the fiber optic light guide 14 with a spread angle of approximately 50°. Light enters the sheet through a generally semi-cylindrical lens 30 placed at the edge 56 of the thin sheet optical element 16. The lens 30 collimates the light generally normal to the edge 56 and generally parallel to the front surface 28 and back surface 32 within the thin sheet optical element 16. The light is directed toward the manifold section 20.

As shown in FIGS. 2 and 4 the manifold section 20 of the present device preferably consists of four recesses 38, 48, 50, and 52 which form four reflective surfaces 40, 42, 44, and 46 that function to expand the light in the direction of the kicker section 22. The recesses 38, 48, 50, and 52 are formed preferably in the back surface 32 and are generally triangular and normal to the back and front surfaces 32 and 28 respectively. The reflective surfaces 40, 42, 44, and 46 are walls formed as a result of the recesses 38, 48, 50, and 52 and are generally normal to the back and emitting surfaces 32 and 28 respectively.

A first recess 38 is an aperture formed in the unitary thin sheet optical element 16 which forms a reflective parabolic surface 40 normal to the front and back surfaces 28 and 32 respectively. This reflective parabolic surface 40 is a plastic-air interface. The reflective parabolic surface 40 receives collimated light from the input section 18. Light incident upon the plastic-air interface totally internally reflects within the thin sheet optical element 16 in the direction of the remaining three reflective surfaces 42, 44, and 46. The collimating ability of this reflective parabolic surface 40 can be seen in the ray trace of FIG. 2. Total internal reflection of the light rays occurs when the incident angle θ exceeds the critical angle $\theta_c$ given by the equation $\theta_c = \sin^{-1}(n_1/n_2)$ wherein $n_1$ is the index of refraction of air and $n_2$ is the index of refraction of plastic. The plastic air interface can be metalized if the light rays strike the interface at an angle less than the critical angle.

The remaining reflective surfaces 42, 44, and 46 are formed from recesses 48, 50, and 52 that partially or completely penetrate the sheet. These recesses 48, 50, and 52 vary in depth normal to the front and back surfaces 28 and 32 respectively. These reflective surfaces 42, 44, and 46 function to receive and apportion the light from the reflective parabolic surface 40 and direct a requisite fraction of the light toward the kicker section 22. A cross sectional view of reflective surfaces 42, 44, and 46 is shown in FIG. 4. As is seen in this figure, the depth incrementally increases from a minimal depth of mirror 42 to the complete penetration of mirror 46. In use, the light directed from the reflective parabolic surface 40 first impacts reflective surface 42 which directs a portion of the light to the kicker section 22. The remaining light proceeds to impact the second reflective surface 44 which directs a second portion of the light to the kicker section 22. Mirror number 46 completely penetrates the thin sheet optical element 16 and directs the remaining light in the direction of the kicker section 22. The depth of the recesses 48, 50, and 52 that form the reflective surfaces 42, 44, and 46 can be adjusted to control the intensity of the reflected light. The variability of the depth allows a convenient way of controlling the spatial distribution of the light entering the kicker section 22. Functionally, the input and manifold sections 18 and 20 respectively, modify the angular and spatial distribution of the light in such a way that the light is directed out of the device by the kicker section 22.

As shown in FIG. 5, the kicker section 22 is a series of steps 54 which are aligned to receive light reflected from the reflective surfaces 42, 44, and 46. Each incremental step 54 has an angled surface 58 and a back surface 32. The back surface 32 is parallel to the emitting surface 28. The angled surface 58 of the steps 54 are angled relative to the collimated light received from the reflective surfaces 42, 44, and 46 to reflect the light via TIR through the front surface 28. The angled surface 58 can be metalized if the light rays strike the interface at an angle less than the critical angle.

Only one embodiment of the tail lamp assembly of the present invention has been described. Those skilled in the automotive lighting arts will appreciate that others may be possible without departing from the scope of the following claims.

We claim:

1. A lamp assembly for use in an automotive vehicle, said lamp assembly comprising:
   (a) a laser light source for transmitting light;
   (b) a unitary optical element adjacent said laser light source for receiving light therefrom, said unitary optical element comprising:
      (i) a front surface;
      (ii) an input portion, with a first light collimator;
      (iii) a manifold portion having an aperture defining a second light collimator along an edge thereof normal to said front surface, said second light collimator positioned so as to direct collimated light in a predetermined direction, said manifold portion further having a plurality of recesses defining reflective surfaces normal to said front surface aligned along said predetermined direction, said plurality of recesses having a depth increasing a predetermined increment along said predetermined direction; and,
      (iv) a kicker portion having a plurality of reflective facets extending a length of said unitary optical element, each of said reflective facets being skewed with respect to said front surface.

2. A lamp assembly according to claim 1, wherein said laser light source is a diode laser.

3. A lamp assembly according to claim 1, wherein said unitary optical element has a thickness between 10 µm–6 mm.

4. A lamp assembly according to claim 1, wherein said first light collimator is a cylindrical lens.

5. A lamp assembly according to claim 1, wherein said first light collimator collimates light parallel to said front surface and within said unitary optical element.

6. A lamp assembly according to claim 1, wherein said second light collimator is a parabolic reflector.

7. A lamp assembly according to claim 1, wherein said second light collimator collimates light substantially parallel to said reflective facets.

8. A lamp assembly according to claim 1, wherein said unitary optical element is comprised of a polymeric material.

9. A lamp assembly for use in an automotive vehicle, said lamp assembly comprising:
   (a) a remote laser light source for transmitting light;
   (b) a light guide for transmitting light from said remote laser light source, said light guide having a first end and a second end, said first end of said light guide connected to said remote laser light source;
   (c) a unitary optical element adjacent said second end of said light guide for receiving light therefrom, said unitary optical element comprising:
      (i) a front surface;
      (ii) an input portion, with a first light collimator;
      (iii) a manifold portion having an aperture defining a second light collimator along an edge thereof normal to said front surface, said second light collimator positioned so as to direct collimated light in a predetermined direction, said manifold portion further having a plurality of recesses defining reflective surfaces normal to said front surface aligned along said predetermined direction, said plurality of recesses having a depth increasing a predetermined increment along said predetermined direction; and,
      (iv) a kicker portion having a plurality of reflective facets extending a length of said unitary optical element, each of said reflective facets being skewed with respect to said front surface.

10. A lamp assembly according to claim 9, wherein said light guide is a glass fiber.

11. A lamp assembly according to claim 10, wherein said glass fiber light guide has a diameter between 0.1–1.0 mm.

12. A lamp assembly according to claim 9, wherein said unitary optical element has a thickness between 10 µm–6 mm.

13. A lamp assembly according to claim 9, wherein said first light collimator is a cylindrical lens.

14. A lamp assembly according to claim 9, wherein said first light collimator collimates light parallel to said front surface and within said unitary optical element.

15. A lamp assembly according to claim 9, wherein said second light collimator is a parabolic reflector.

16. A lamp assembly according to claim 9, wherein said second light collimator collimates light substantially parallel to said reflective facets.

17. A lamp assembly for use in an automotive vehicle, said lamp assembly comprising:
   (a) a remote laser light source for transmitting light;
   (b) a light guide for transmitting light from said remote laser light source, said light guide having a first end and a second end, said first end of said light guide connected to said remote laser light source;
   (c) a unitary optical element adjacent said second end of said light guide for receiving light therefrom, said unitary optical element comprising:
      (i) a front surface;
      (ii) an input portion having a first light collimator disposed on an edge of said unitary optical element, said first light collimator collimating light parallel to said front surface and within said unitary optical element;
      (iii) a manifold portion having an aperture normal to said front surface, said aperture defining a parabolic reflector normal to said front surface, said parabolic reflector collimating light substantially parallel to said edge, said manifold portion further having a plurality of recesses adjacent to said parabolic reflector including a most proximate recess and a most distal recess, said plurality of recesses defining reflective surfaces normal to said front surface, said plurality of recesses having a depth normal to said front surface, said depth increasing incrementally from the most proximate recess to the most distal recess; and, (iv) a kicker portion having a plurality of reflective facets extending a length of said unitary optical element, each of said reflective facets being skewed with respect to said front surface.

* * * * *